US009031257B2

(12) United States Patent
Sorensen et al.

(10) Patent No.: US 9,031,257 B2
(45) Date of Patent: May 12, 2015

(54) PROCESSING SIGNALS (75) Inventors: Karsten Vandborg Sorensen, Stockholm (SE); Per Åhgren, Stockholm (SE)

(73) Assignee: Skype, Dublin (IE)

( * ) Notice: Subject to any disclaimer, the term of this patent is extended or adjusted under 35 U.S.C. 154(b) by 718 days.

(21) Appl. No.: 13/327,250

(22) Filed: Dec. 15, 2011

(65) Prior Publication Data

US 2013/0083943 A1    Apr. 4, 2013

(30) Foreign Application Priority Data

Sep. 30, 2011   (GB) .................................. 1116846.5

(51) Int. Cl.
*H04R 3/00*   (2006.01)
*G01S 3/808*  (2006.01)
*G01S 3/86*   (2006.01)

(52) U.S. Cl.
CPC .............. *H04R 3/005* (2013.01); *G01S 3/8086* (2013.01); *G01S 3/86* (2013.01)

(58) Field of Classification Search
CPC ............... H04R 3/005; H04R 2430/20; H04R 2430/23; G10L 2021/02166; G01S 3/86; G01S 3/8086
USPC ................................ 381/91, 92, 122; 700/94
See application file for complete search history.

(56) References Cited

U.S. PATENT DOCUMENTS

| 4,849,764 A | 7/1989 | van Heyningen |
| 5,208,864 A | 5/1993 | Kaneda |
| 5,524,059 A | 6/1996 | Zurcher |
| 6,157,403 A | 12/2000 | Nagata |
| 6,232,918 B1 | 5/2001 | Wax et al. |
| 6,339,758 B1 | 1/2002 | Kanazawa et al. |
| 6,914,854 B1 * | 7/2005 | Heberley et al. .............. 367/119 |
| 8,249,862 B1 | 8/2012 | Cheng et al. |
| 8,325,952 B2 | 12/2012 | Cho |

(Continued)

FOREIGN PATENT DOCUMENTS

| CA | 2413217 | 5/2004 |
| CN | 100446530 | 3/2001 |

(Continued)

OTHER PUBLICATIONS

"PCT Search Report and Written Opinion", Application No. PCT/US2012/058146, (Jan. 21, 2013),9 pages.

(Continued)

*Primary Examiner* — Paul S Kim
(74) *Attorney, Agent, or Firm* — Sonia Cooper; Jim Ross; Micky Minhas (57) ABSTRACT

Method, device and computer program product for processing signals at the device. Signals are received, over a range of angles, at a plurality of sensors of the device, the received signals including an interfering signal received from an interfering source location. An interference delay pattern between receipt of signals at the sensors corresponding to receipt of a signal from the interfering source location is determined. A plurality of regularization signals having a delay pattern matching the determined interference delay pattern are generated. The generated regularization signals are used to determine beamformer coefficients to be applied by a beamformer, and the beamformer applies the determined beamformer coefficients to the signals received by the plurality of sensors, thereby generating a beamformer output.

19 Claims, 8 Drawing Sheets

(56) References Cited

U.S. PATENT DOCUMENTS

| | | | |
|---|---|---|---|
| 8,401,178 | B2 | 3/2013 | Chen et al. |
| 8,620,388 | B2 | 12/2013 | Hayakawa et al. |
| 8,824,693 | B2 | 9/2014 | Ahgren |
| 8,891,785 | B2 | 11/2014 | Sorensen |
| 8,981,994 | B2 | 3/2015 | Sorensen |
| 2002/0015500 | A1 | 2/2002 | Belt et al. |
| 2002/0103619 | A1 | 8/2002 | Bizjak |
| 2002/0171580 | A1 | 11/2002 | Gaus et al. |
| 2004/0125942 | A1 | 7/2004 | Beaucoup et al. |
| 2004/0213419 | A1 | 10/2004 | Varma et al. |
| 2005/0149339 | A1 | 7/2005 | Tanaka et al. |
| 2005/0216258 | A1 | 9/2005 | Kobayashi et al. |
| 2005/0232441 | A1 | 10/2005 | Beaucoup et al. |
| 2006/0015331 | A1 | 1/2006 | Hui et al. |
| 2006/0031067 | A1 | 2/2006 | Kaminuma |
| 2006/0133622 | A1 | 6/2006 | Chen |
| 2006/0153360 | A1 | 7/2006 | Kellermann et al. |
| 2006/0269073 | A1 | 11/2006 | Mao |
| 2007/0164902 | A1 | 7/2007 | Bang et al. |
| 2008/0039146 | A1 | 2/2008 | Jin |
| 2008/0199025 | A1 | 8/2008 | Amada |
| 2008/0232607 | A1 | 9/2008 | Tashev et al. |
| 2008/0260175 | A1 | 10/2008 | Elko |
| 2009/0010453 | A1 | 1/2009 | Zurek et al. |
| 2009/0076810 | A1 | 3/2009 | Matsuo |
| 2009/0076815 | A1 | 3/2009 | Ichikawa et al. |
| 2009/0125305 | A1 | 5/2009 | Cho |
| 2009/0274318 | A1 | 11/2009 | Ishibashi et al. |
| 2009/0304211 | A1 | 12/2009 | Tashev et al. |
| 2010/0014690 | A1 | 1/2010 | Wolff et al. |
| 2010/0027810 | A1 | 2/2010 | Marton |
| 2010/0070274 | A1 | 3/2010 | Cho et al. |
| 2010/0081487 | A1 | 4/2010 | Chen et al. |
| 2010/0103776 | A1 | 4/2010 | Chan |
| 2010/0128892 | A1 | 5/2010 | Chen et al. |
| 2010/0150364 | A1 | 6/2010 | Buck et al. |
| 2010/0177908 | A1 | 7/2010 | Seltzer et al. |
| 2010/0215184 | A1 | 8/2010 | Buck et al. |
| 2010/0217590 | A1 | 8/2010 | Nemer et al. |
| 2010/0246844 | A1 | 9/2010 | Wolff et al. |
| 2010/0296665 | A1 | 11/2010 | Ishikawa et al. |
| 2010/0315905 | A1 | 12/2010 | Lee et al. |
| 2010/0323652 | A1 | 12/2010 | Visser et al. |
| 2011/0038486 | A1 | 2/2011 | Beaucoup |
| 2011/0038489 | A1 | 2/2011 | Visser et al. |
| 2011/0054891 | A1 | 3/2011 | Vitte et al. |
| 2011/0070926 | A1 | 3/2011 | Vitte et al. |
| 2011/0158418 | A1 | 6/2011 | Bai et al. |
| 2011/0178798 | A1 | 7/2011 | Flaks et al. |
| 2012/0182429 | A1 | 7/2012 | Forutanpour et al. |
| 2012/0303363 | A1 | 11/2012 | Sorensen |
| 2013/0013303 | A1 | 1/2013 | Strommer et al. |
| 2013/0034241 | A1 | 2/2013 | Pandey et al. |
| 2013/0082875 | A1 | 4/2013 | Sorensen |
| 2013/0083832 | A1 | 4/2013 | Sorensen |
| 2013/0083934 | A1 | 4/2013 | Åhgren |
| 2013/0083936 | A1 | 4/2013 | Sorensen |
| 2013/0083942 | A1 | 4/2013 | Åhgren et al. |
| 2013/0129100 | A1 | 5/2013 | Sorensen |
| 2013/0136274 | A1 | 5/2013 | Åhgren |
| 2013/0148821 | A1 | 6/2013 | Sorensen |

FOREIGN PATENT DOCUMENTS

| | | |
|---|---|---|
| CN | 1406066 | 3/2003 |
| CN | 1698395 | 11/2005 |
| CN | 1809105 | 7/2006 |
| CN | 1815918 | 8/2006 |
| CN | 1835416 | 9/2006 |
| CN | 1885848 | 12/2006 |
| CN | 101015001 | 8/2007 |
| CN | 101018245 | 8/2007 |
| CN | 101207663 | 6/2008 |
| CN | 100407594 | 7/2008 |
| CN | 101278596 | 10/2008 |
| CN | 101455093 | 6/2009 |
| CN | 101625871 | 1/2010 |
| CN | 101667426 | 3/2010 |
| CN | 101685638 | 3/2010 |
| CN | 101828410 | 9/2010 |
| CN | 102111697 | 6/2011 |
| CN | 102131136 | 7/2011 |
| CN | 1540903 | 10/2014 |
| DE | 19943872 | 3/2001 |
| EP | 0002222 | 6/1979 |
| EP | 0654915 | 5/1995 |
| EP | 1722545 | 11/2006 |
| EP | 1919251 | 5/2008 |
| EP | 1930880 | 6/2008 |
| EP | 2026329 | 2/2009 |
| EP | 2159791 | 3/2010 |
| EP | 2175446 | 4/2010 |
| EP | 2197219 | 6/2010 |
| EP | 2222091 | 8/2010 |
| EP | 2339574 | 6/2011 |
| JP | 2006109340 | 4/2006 |
| JP | 2006319448 | 11/2006 |
| JP | 2006333069 | 12/2006 |
| JP | 2010232717 | 10/2010 |
| TW | 201123175 | 7/2011 |
| WO | WO-0018099 | 3/2000 |
| WO | WO-03010996 | 2/2003 |
| WO | WO-2007127182 | 11/2007 |
| WO | WO-2008041878 | 4/2008 |
| WO | WO-2008062854 | 5/2008 |
| WO | WO-2010098546 | 9/2010 |
| WO | WO 2012097314 | 7/2012 |

OTHER PUBLICATIONS

"PCT Search Report and Written Opinion", Application No. PCT/2012/066485, (Feb. 15, 2013),12 pages.

"PCT Search Report and Written Opinion", Application No. PCT/US2012/2065737, (Feb. 13, 2013),12 pages.

"PCT Search Report and Written Opinion", Application No. PCT/US/2012/045556, (Jan. 2, 2013),10 pages.

"PCT Search Report and Written Opinion", Application No. PCT/US2012/058145, (Apr. 24, 2013),18 pages.

Grbic, Nedelko et al., "Soft Constrained Subband Beamforming for Hands-Free Speech Enhancement", *In Proceedings of ICASSP 2002*, (May 13, 2002), 4 pages.

"International Search Report and Written Opinion", Application No. PCT/US2013/058144, (Sep. 11, 2013),10 pages.

"Non-Final Office Action", U.S. Appl. No. 13/212,633, (Nov. 1, 2013),14 pages.

"Non-Final Office Action", U.S. Appl. No. 13/212,688, (Nov. 7, 2013),14 pages.

Knapp, et al., "The Generalized Correlation Method for Estimation of Time Delay", *IEEE Transactions on Acoustics, Speech, and Signal Processing*, vol. ASSP-24, No. 4, (Aug. 1976), pp. 320-327.

"Non-Final Office Action", U.S. Appl. No. 13/341,610, Dec. 27, 2013, 10 pages.

"Non-Final Office Action", U.S. Appl. No. 13/307,994, Dec. 19, 2013, 12 pages.

"Non-Final Office Action", U.S. Appl. No. 13/307,852, Feb. 20, 2014, 5 pages.

"Search Report", GB Application No. 1119932.0, Feb. 28, 2013, 8 pages.

"Foreign Office Action", CN Application No. 201210368101.5, Dec. 6, 2013, 9 pages.

"PCT Search Report and Written Opinion", Application No. PCT/US2012/068649, (Mar. 7, 2013), 9 pages.

"PCT Search Report and Written Opinion", Application No. PCT/US2012/058148, (May 3, 2013), 9 pages.

"PCT Search Report and Written Opinion", Application No. PCT/US2012/058147, (May 8, 2013), 9 pages.

"PCT Search Report and Written Opinion", Application No. PCT/US2012/058143, (Dec. 21, 2012),12 pages.

(56) References Cited

OTHER PUBLICATIONS

Goldberg, et al., "Joint Direction-of-Arrival and Array Shape Tracking for Multiple Moving Targets", *IEEE International Conference on Acoustics, Speech, and Signal Processing,* (Apr. 21, 1997), pp. 511-514.

Handzel, et al., "Biomimetic Sound-Source Localization", *IEEE Sensors Journal,* vol. 2, No. 6, (Dec. 2002), pp. 607-616.

Kellerman, W. "Strategies for Combining Acoustic Echo Cancellation and Adaptive Beamforming Microphone Arrays", *In Proceedings of ICASSP 1997,* (Apr. 1997), pp. 219-222.

"Search Report", GB Application No. 1108885.3, (Sep. 3, 2012), 3 pages.

"Search Report", GB Application No. 1111474.1, (Oct. 24, 2012), 3 pages.

"Search Report", GB Application No. 1116847.3, (Dec. 20, 2012), 3 pages.

"Corrected Notice of Allowance", U.S. Appl. No. 13/307,994, Jun. 24, 2014, 2 pages.

"Final Office Action", U.S. Appl. No. 13/212,633, May 23, 2014, 16 pages.

"Final Office Action", U.S. Appl. No. 13/212,688, Jun. 5, 2014, 20 pages.

"Final Office Action", U.S. Appl. No. 13/341,610, Jul. 17, 2014, 7 pages.

"Foreign Office Action", CN Application No. 201210368224.9, Jun. 5, 2014, 11 pages.

"Non-Final Office Action", U.S. Appl. No. 13/307,852, May 16, 2014, 4 pages.

"Non-Final Office Action", U.S. Appl. No. 13/308,165, Jul. 17, 2014, 14 pages.

"Notice of Allowance", U.S. Appl. No. 13/308,106, Jun. 27, 2014, 7 pages.

"Supplemental Notice of Allowance", U.S. Appl. No. 13/307,994, Aug. 8, 2014, 2 pages.

"Search Report", Application No. GB1116846.5, Jan. 28, 2013, 3 pages.

"Search Report", GB Application No. 1116840.8, Jan. 29, 2013, 3 pages.

"Search Report", GB Application No. 1116843.2, Jan. 30, 2013, 3 pages.

"Search Report", GB Application No. 1116869.7, Feb. 7, 2013, 3 pages.

"Search Report", GB Application No. 1121147.1, Feb. 14, 2013, 5 pages.

"UK Search Report", UK Application No. GB1116848.1, Dec. 18, 2012, 3 pages.

"Foreign Office Action", CN Application No. 201210377130.8, Jan. 15, 2014, 12 pages.

"International Search Report and Written Opinion", Application No. PCT/EP2012/059937, Feb. 14, 2014, 9 pages.

"Non-Final Office Action", U.S. Appl. No. 13/327,308, Mar. 28, 2014, 13 pages.

"Notice of Allowance", U.S. Appl. No. 13/307,994, Apr. 1, 2014, 7 pages.

"Final Office Action", U.S. Appl. No. 13/327,308, Dec. 2, 2014, 6 pages.

"Foreign Office Action", CN Application No. 201210367888.3, Jul. 15, 2014, 13 pages.

"Foreign Office Action", CN Application No. 201210368101.5, Jun. 20, 2014, 7 pages.

"Foreign Office Action", CN Application No. 201210377115.3, Aug. 27, 2014, 18 pages.

"Foreign Office Action", CN Application No. 201210377130.8, Sep. 28, 2014, 7 pages.

"Foreign Office Action", CN Application No. 201210377215.6, Mar. 24, 2014, 16 pages.

"Foreign Office Action", CN Application No. 201210462710.7, Mar. 5, 2014, 12 pages.

"Foreign Office Action", CN Application No. 201210485807.X, Oct. 8, 2014, 10 pages.

"Foreign Office Action", CN Application No. 201210521742.X, Oct. 8, 2014, 16 pages.

"Non-Final Office Action", U.S. Appl. No. 13/212,633, Nov. 28, 2014, 16 pages.

"Non-Final Office Action", U.S. Appl. No. 13/308,210, Aug. 18, 2014, 6 pages.

"Notice of Allowance", U.S. Appl. No. 13/307,852, Sep. 12, 2014, 4 pages.

"Notice of Allowance", U.S. Appl. No. 13/308,210, Dec. 16, 2014, 6 pages.

"Supplemental Notice of Allowance", U.S. Appl. No. 13/307,852, Oct. 22, 2014, 2 pages.

Goldberg, et al., "Joint Direction-of-Arrival and Array-Shape Tracking for Multiple Moving Targets", IEEE International Conference on Acoustic, Speech, and Signal Processing, Apr. 25, 1997, 4 pages.

"Corrected Notice of Allowance", U.S. Appl. No. 13/307,852, Dec. 18, 2014, 2 pages.

"Foreign Office Action", GB Application No. 1121147.1, Apr. 25, 2014, 2 pages.

"Notice of Allowance", U.S. Appl. No. 13/308,165, Dec. 23, 2014, 7 pages.

"Notice of Allowance", U.S. Appl. No. 13/341,610, Dec. 26, 2014, 8 pages.

"Corrected Notice of Allowance", U.S. Appl. No. 13/307,852, Feb. 20, 2015, 2 pages.

"Corrected Notice of Allowance", U.S. Appl. No. 13/308,165, Feb. 17, 2015, 2 pages.

"Corrected Notice of Allowance", U.S. Appl. No. 13/308,210, Feb. 17, 2015, 2 pages.

"Foreign Notice of Allowance", CN Application No. 201210368224.9, Jan. 6, 2015, 3 pages.

"Foreign Notice of Allowance", CN Application No. 201210377130.8, Jan. 17, 2015, 3 pages.

"Foreign Notice of Allowance", CN Application No. 201210462710.7, Jan. 6, 2015, 6 pages.

"Foreign Office Action", CN Application No. 201210377215.6, Jan. 23, 2015, 11 pages.

"Foreign Office Action", EP Application No. 12784776.2, Jan. 30, 2015, 6 pages.

"Foreign Office Action", EP Application No. 12809381.2, Feb. 9, 2015, 8 pages.

"Foreign Office Action", EP Application No. 12878205.9, Feb. 9, 2015, 6 pages.

"Non-Final Office Action", U.S. Appl. No. 13/212,688, Feb. 27, 2015, 23 pages.

"Non-Final Office Action", U.S. Appl. No. 13/341,607, Mar. 27, 2015, 10 pages.

\* cited by examiner

PROCESSING SIGNALS

RELATED APPLICATION

This application claims priority under 35 U.S.C. §119 or 365 to Great Britain, Application No. GB1116846.5, filed Sep. 30, 2011. The entire teachings of the above application are incorporated herein by reference.

TECHNICAL FIELD

The present invention relates to processing signals received at a device.

BACKGROUND

A device may have input means that can be used to receive transmitted signals from the surrounding environment. For example, a device may have audio input means such as a microphone that can be used to receive audio signals from the surrounding environment. For example, a microphone of a user device may receive a primary audio signal (such as speech from a user) as well as other audio signals. The other audio signals may be interfering audio signals received at the microphone of the device, and may be received from an interfering source or may be ambient background noise or microphone self-noise. The interfering audio signals may disturb the primary audio signals received at the device. The device may use the received audio signals for many different purposes. For example, where the received audio signals are speech signals received from a user, the speech signals may be processed by the device for use in a communication event, e.g. by transmitting the speech signals over a network to another device which may be associated with another user of the communication event. Alternatively, or additionally, the received audio signals could be used for other purposes, as is known in the art.

In other examples, a device may have receiving means for receiving other types of transmitted signals, such as radar signals, sonar signals, antenna signals, radio waves, microwaves and general broadband signals or narrowband signals. The same situations can occur for these other types of transmitted signals whereby a primary signal is received as well as interfering signals at the receiving means. The description below is provided mainly in relation to the receipt of audio signals at a device, but the same principles will apply for the receipt of other types of transmitted signals at a device, such as general broadband signals, general narrowband signals, radar signals, sonar signals, antenna signals, radio waves and microwaves as described above.

In order to improve the quality of the received audio signals, (e.g. the speech signals received from a user for use in a call), it is desirable to suppress interfering audio signals (e.g. background noise and interfering audio signals received from interfering audio sources) that are received at the microphone of the user device.

The use of stereo microphones and other microphone arrays in which a plurality of microphones operate as a single audio input means is becoming more common. The use of a plurality of microphones at a device enables the use of extracted spatial information from the received audio signals in addition to information that can be extracted from an audio signal received by a single microphone. When using such devices one approach for suppressing interfering audio signals is to apply a beamformer to the audio signals received by the plurality of microphones. Beamforming is a process of focussing the audio signals received by a microphone array by applying signal processing to enhance particular audio signals received at the microphone array from one or more desired locations (i.e. directions and distances) compared to the rest of the audio signals received at the microphone array. For simplicity we will describe the case with only a single desired direction herein, but the same method will apply when there are more directions of interest. The angle (and/or the distance) from which the desired audio signal is received at the microphone array, so-called Direction of Arrival ("DOA") information can be determined or set prior to the beamforming process. It can be advantageous to set the desired direction of arrival to be fixed since the estimation of the direction of arrival may be complex. However, in alternative situations it can be advantageous to adapt the desired direction of arrival to changing conditions, and so it may be advantageous to perform the estimation of the desired direction of arrival in real-time as the beamformer is used. Adaptive beamformers apply a number of weights (or "beamformer coefficients") to the received audio signals. These weights can be adapted to take into account the DOA information to process the audio signals received by the plurality of microphones to form a "beam" whereby a high gain is applied to desired audio signals received by the microphones from a desired location (i.e. a desired direction and distance) and a low gain is applied in the directions to any other (e.g. interfering) signal sources.

The output of the beamformer can be further processed in the device in the same way as a received audio signal from a single microphone may be processed, e.g. for transmission to another device as part of a communication event. For example, the output of the beamformer may be supplied as an input signal to at least one of an Automatic Gain Control (AGC) processing stage and a single channel noise reduction stage in the device.

The Minimum Variance Distortionless Response (MVDR) beamformer, also known as the Capon beamformer, is part of a class of beamformers that adapt the beamformer coefficients applied to the audio signals to thereby minimize the energy of the output signal based on the input signals under a constraint of not distorting the primary audio signals received with a principal direction of arrival at the device (i.e. audio signals received from the direction of focus of the beamformer). The beamformer weights can be calculated using the inverse of a covariance matrix of the audio signals received at the microphone array. The covariance matrix provides an indication of the correlation of the audio signals received at the different microphones of the microphone array when different delays are applied to the received audio signals (corresponding to different directions of arrival of audio signals at the microphone array). In particular, the cross-covariance indicates the direction of arrival for which the audio signals received at the plurality of microphones are most highly correlated, and this may be taken as the principal direction of arrival of the primary audio signals. Although the beamformer adaptation based on the input signals is useful in minimizing the energy of the output signal, adapting the beamformer in this way tends to distort the output signals as it varies over time. In particular, any irregularities or sudden changes to the beamformer can result in audible distortion of the output from the beamformer (as the beampattern of the beamformer is suddenly changed).

Spectral regularization may be applied to the received audio signals prior to calculating the covariance matrix. For example, white noise may be added to the audio signals by adding a scaled identity matrix to the covariance matrix in order to lower the condition number of the matrix before inversion for avoiding the problem of inverting a potentially ill-conditioned matrix.

Furthermore, injection of white noise in the covariance matrix can be used to ensure that energy is never amplified by the beamformer, and to ensure that ambient noise suppression is achieved, at the cost of attenuation of the stronger interfering sources. This method provides one way to regularize the adaptation of the beamformer to achieve slightly better beamformer behaviour, but it does not provide sufficient means to prevent distortion in the beamformer output.

SUMMARY

However, the inventors have realised that further regularization of the beamformer may be beneficial. In particular, it has been realised that the MVDR and LCMV beamformers described above tend to distort signals that are arriving from other directions than the principal direction of arrival both when the interfering sources are moving around in space and when they change signal spectrum over time. Furthermore, the MVDR and LCMV beamformer described above can distort frequencies that are separate from the main frequency content of the received signals.

The beampattern of a beamformer may vary as a function of angle, distance and frequency, and the beamformer may be adaptively optimized to lower the energy of the current input signals (e.g. under the given constraints of not distorting the signals in the direction of focus). However, as a result of fluctuations in the beampattern over time in directions other than the principal direction of arrival, signals received at the device from these other directions may suffer from distortion. Furthermore, as the beamformer optimization may be performed without the desirable constraints, the optimization may result in an undesired amplification of low powered input signal components arriving at the device from particular directions. Advantageously, according to embodiments of the invention the direction of an interfering signal is identified and directional regularization is applied to the received signals that are used to adapt the beamformer filter coefficients (from which we can calculate the beampattern of the beamformer) to ensure little or no distortion of the interfering signal while still applying attenuation to the interfering signal.

According to a first aspect of the invention there is provided a method of processing signals at a device, the method comprising: receiving signals, over a range of angles, at a plurality of sensors of the device, the received signals including an interfering signal received from an interfering source location; determining an interference delay pattern between receipt of signals at the sensors corresponding to receipt of a signal from the interfering source location; generating a plurality of regularization signals having a delay pattern matching the determined interference delay pattern; using the generated regularization signals to determine beamformer coefficients to be applied by a beamformer; and the beamformer applying the determined beamformer coefficients to the signals received by the plurality of sensors, thereby generating a beamformer output.

In some embodiments a combination of the generated regularization signals and the received signals are used to determine the beamformer coefficients to be applied by the beamformer. For example, the method may further comprise determining modified versions of the received signals in which the plurality of regularization signals are included in the respective signals received by the plurality of sensors, wherein the beamformer coefficients are determined based on the modified versions of the received signals.

Advantageously, the beamformer is adapted based on the regularization signals (e.g. a certain mix of artificial signals) having delay patterns corresponding to the interference delay patterns of signals received at the sensors from the interfering source locations. When regularization signals are added to input signals, the resulting signals (i.e. the modified versions of the received signals) may be called "regularized signals". It is also possible to adapt the beamformer based on such regularized signals. In this way, when the beamformer processes the received signals it will apply a greater level of attenuation to signals received at the sensors from the interfering source locations (i.e. from the directions and distances of the interfering sources). This also means that variations in the interfering signals do not affect the beamformer so much since the level of attenuation applied to signals received from the interfering source locations remains high due to the regularization signals even when the interfering signals temporarily has a low power. In other words, the beampattern of the beamformer is more stable in the directions of the interfering audio signals. This stability, i.e. reduction in the speed at which the beampattern varies, in the direction of the interfering audio signals reduces the distortion of the interfering audio signal in the beamformer output. In a preferred embodiment, the beamformer is adapted based entirely on artificially generated regularization noise signals which resembles the distortion in the received signals but which varies more smoothly and in a more controlled manner. In this case, the beamformer filter coefficients only need to be updated when the regularization signals are changed, which advantageously happens in a smooth manner.

Indeed, in preferred embodiments, the method comprises selecting the plurality of regularization signals such that the beamformer coefficients vary sufficiently slowly to, for example, prevent variations of the beamformer coefficients causing perceptually unacceptable distortion of the beamformer output.

Embodiments of the invention allow the beamformer behaviour to be controlled for any angle which is determined would benefit from fewer fluctuations over time and/or variations over frequency. Examples of interfering sources which may benefit from embodiments of the invention are speakers which are not located in the centre of the main lobe of the beampattern. According to preferred embodiments, the beamformer can be controlled by injecting a variable amount of noise at each angle to ensure that the beampattern evolves slowly such that the beamformer provides a pleasant sounding output.

The signals may be audio signals, and the sensors may be microphones for receiving the audio signals. Alternatively, the signals may be other types of transmitted signals such as general broadband signals, general narrowband signals, radar signals, sonar signals, antenna signals, radio waves or microwaves.

The audio signals received by the plurality of sensors may include a primary signal received from a principal source location. In preferred embodiments, the beamformer is adapted so as to minimise the power in the signals which are used to determine the beamformer coefficients under certain constraints. For example the constraints may include a constraint that the primary signal is not distorted by the beamformer.

The regularization signals may be mutually uncorrelated noise signals. In one embodiment, the noise signals have a predetermined spectral shape. This means that the effect of including the noise signals in the received audio signals has a predictable effect on the beampattern in the frequency domain. For example, the noise signals may be statistically independent samples with a spectrally flat, that is, white spectrum. In this way the inclusion of the noise signals in the received audio signals has a similar effect on the beampattern for all frequencies. Furthermore, in the case where the noise signals preferably comprise statistically independent samples, and thereby ensure that the noise signals only correlate when they are perfectly aligned, i.e. in the interfering direction, the directional regularization at different angles becomes statistically independent. The spectral shape of the regularization noise signals may be something in between white noise and whatever the spectral shape is of the actual background noise in the received signals. This is particularly useful for ensuring more suppression of interference in the case where the beamformer is adapted based entirely on artificially generated regularization signals.

According to a second aspect of the invention there is provided a device for processing signals, the device comprising: a beamformer; a plurality of sensors for receiving signals over a range of angles, the received signals including an interfering signal received from an interfering source location; means for determining an interference delay pattern between receipt of signals at the sensors corresponding to receipt of a signal from the interfering source location; means for generating a plurality of regularization signals having a delay pattern matching the determined interference delay pattern; and means for using the generated regularization signals to determine beamformer coefficients to be applied by the beamformer, wherein the beamformer is configured to apply the determined beamformer coefficients to the signals received by the plurality of sensors, to thereby generate a beamformer output. The beamformer may, for example, be a Minimum Variance Distortionless Response beamformer.

According to a third aspect of the invention there is provided a computer program product for processing signals received over a range of angles, at a plurality of sensors of a device, the received signals including an interfering signal received from an interfering source location, the computer program product being embodied on a non-transient computer-readable medium and configured so as when executed on a processor of the device to perform the steps of: determining an interference delay pattern between receipt of signals at the sensors corresponding to receipt of a signal from the interfering source location; generating a plurality of regularization having a delay pattern matching the determined interference delay pattern; using the generated regularization signals to determine beamformer coefficients to be applied by a beamformer; and implementing the beamformer to apply the determined beamformer coefficients to the signals received by the plurality of sensors, thereby generating a beamformer output.

BRIEF DESCRIPTION OF THE DRAWINGS

For a better understanding of the present invention and to show how the same may be put into effect, reference will now be made, by way of example, to the following drawings in which.

DETAILED DESCRIPTION

Preferred embodiments of the invention will now be described by way of example only.

In the following embodiments of the invention, techniques are described in which the input to an adaptive beamformer is directionally regularized during the adaptation of the beamformer filter coefficients. The embodiments described below relate to the case where the signals are audio signals. However, other embodiments relate to cases where the signals are other types of transmitted signals, such as general broadband signals, general narrowband signals, radar signals, sonar signals, antenna signals, radio waves or microwaves. The same realization of noise (i.e. "regularization signals") of any particular spectral shape, for example white noise as in a preferred embodiment, is injected into a copy of the microphone input signals, with a signal delay difference (or "delay pattern") between the microphone input signals which is the same as that identified for interfering audio signals from a source of interference. This guarantees high correlation of the regularization noise signals at delays which corresponds to the direction of the interference, which in turn ensures that the beamformer, that is adapted based on a copy with the injected noise, is trained to minimize signals from the direction of the interference. The injected noise reduces the distortion of the interfering audio signals in the beamformer output. This can also help to prevent undesired amplification of low powered input signal components arriving from the direction of the interfering audio signals. Advantageously, the directional regularization applied in preferred embodiments of the invention provides a beamformer with a smooth beampattern which evolves slowly over time to thereby provide a pleasant sounding beamformer output.

Figure 1:
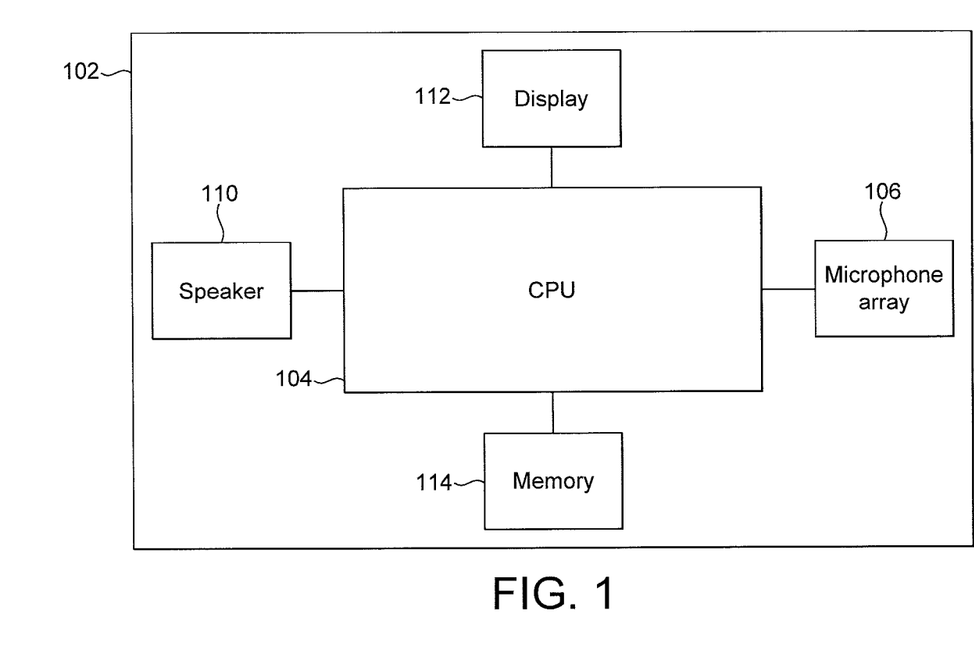
FIG. 1 shows a schematic view of a device according to a preferred embodiment.

Reference is first made to FIG. 1 which illustrates a schematic view of a device 102. The device 102 may be a fixed or a mobile device. The device 102 comprises a CPU 104, to which is connected a microphone array 106 for receiving audio signals, a speaker 110 for outputting audio signals, a display 112 such as a screen for outputting visual data to a user of the device 102 and a memory 114 for storing data.

Figure 2:
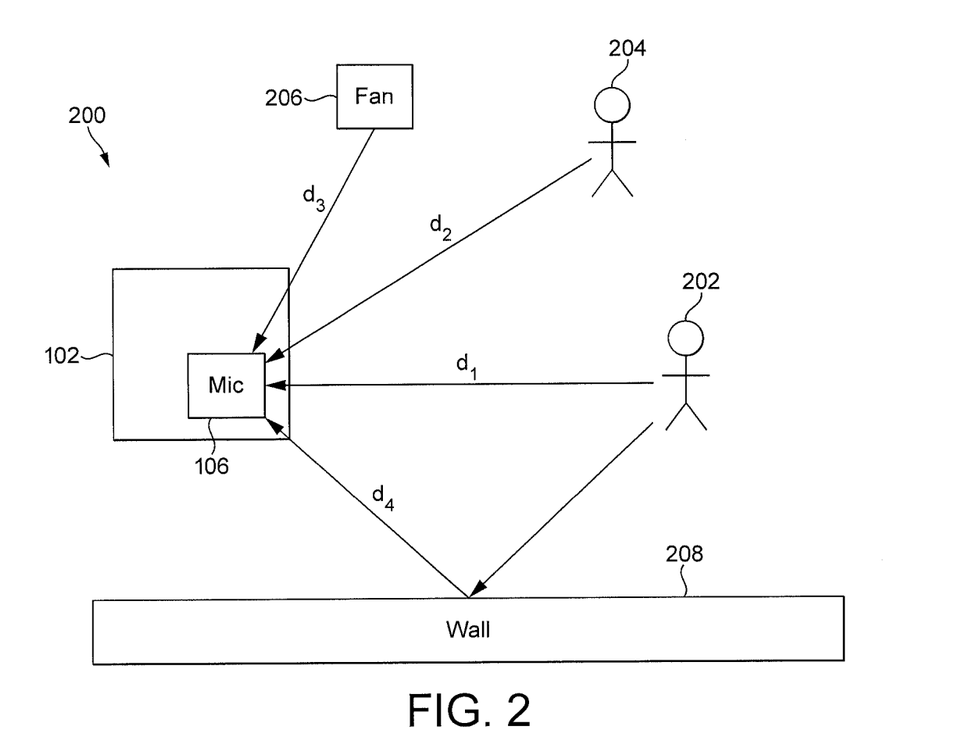
FIG. 2 shows a system according to a preferred embodiment.

Reference is now made to FIG. 2, which illustrates an example environment 200 in which the device 102 operates.

The microphone array 106 of the device 102 receives audio signals from the environment 200. For example, as shown in FIG. 2, the microphone array 106 receives audio signals from a user 202 (as denoted $d_1$ in FIG. 2), audio signals from another user 204 (as denoted $d_2$ in FIG. 2), audio signals from a fan 206 (as denoted $d_3$ in FIG. 2) and audio signals from the user 202 reflected off a wall 208 (as denoted $d_4$ in FIG. 2). It will be apparent to a person skilled in the art that the microphone array 106 may receive other audio signals than those shown in FIG. 2. In the scenario shown in FIG. 2 the audio signals from the user 202 are the desired audio signals, and all the other audio signals which are received at the microphone array 106 are interfering audio signals. In other embodiments more than one of the audio signals received at the microphone array 106 may be considered "desired" audio signals, but for simplicity, in the embodiments described herein there is only one desired audio signal (that being the audio signal from user 202) and the other audio signals are considered to be interference. FIG. 2 shows interference sources being another user 204, a fan 206 or a reflection from a wall 208. Other sources of unwanted noise signals may include for example air-conditioning systems, and a device playing music.

The desired audio signal(s) is(are) identified when the audio signals are processed after having been received at the microphone array 106. During processing, desired audio signals are identified based on the detection of speech like characteristics, and a principal direction of a main speaker is determined. FIG. 2 shows the main speaker (user 202) as the source of the desired audio signal that arrives at the microphone array 106 from the principal direction $d_1$.

Figure 3:
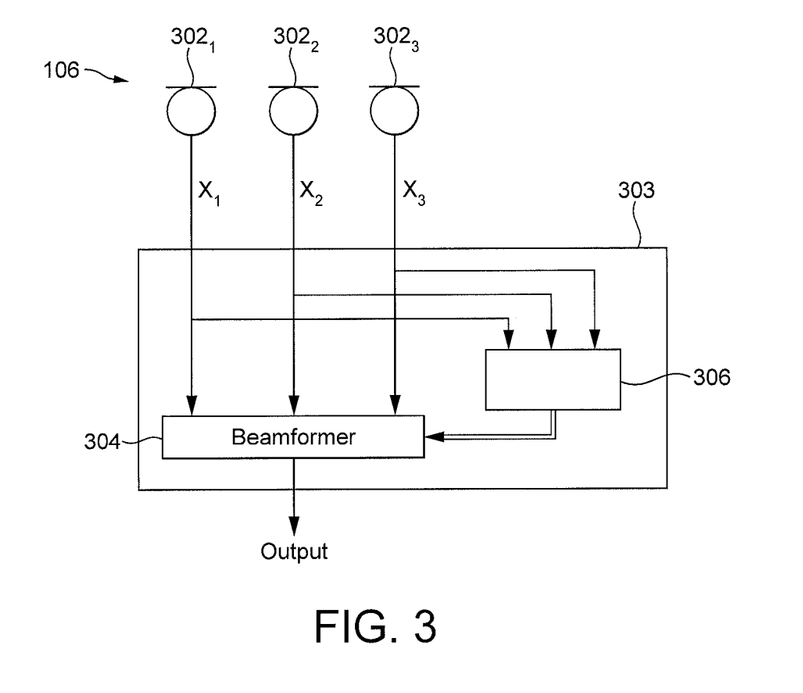
FIG. 3 shows a functional block diagram of elements of a device according to a preferred embodiment.

Reference is now made to FIG. 3 which illustrates a functional representation of elements of the device 102. The microphone array 106 comprises a plurality of microphones $302_1$, $302_2$ and $302_3$. The device 102 further comprises a beamforming module 303 which comprises a beamformer 304 and processing means 306. The beamformer 304 and the processing means 306 may be implemented in software executed on the CPU 104 or implemented in hardware in the device 102. The output of each microphone in the microphone array 106 is coupled to a respective input of the beamforming module 303. In particular, the output of each microphone in the microphone array 106 is coupled to a respective input of the beamformer 304 and also to a respective input of the processing means 306. Persons skilled in the art will appreciate that multiple inputs are needed in order to implement beamforming. The microphone array 106 is shown in FIG. 3 as having three microphones ($302_1$, $302_2$ and $302_3$), but it will be understood that this number of microphones is merely an example and is not limiting in any way.

The beamforming module 303 includes means for receiving and processing the audio signals $x_1$, $x_2$ and $x_3$ from the microphones $302_1$, $302_2$ and $302_3$ of the microphone array 106. For example, the beamforming module 303 may comprise a voice activity detector (VAD) and a DOA estimation block (not shown in FIG. 3). In operation the beamforming module 303 ascertains the nature of the audio signals received by the microphone array 106 and based on detection of speech like qualities detected by the VAD and the DOA estimation block, one or more principal direction(s) of the main speaker (s) may be determined. In other embodiments the principal direction(s) of the main speaker(s) may be pre-set in the beamforming module 303 such that the beamformer 304 focuses on fixed directions. In the example shown in FIG. 2 the direction of audio signals ($d_1$) received from the user 202 is determined to be the principal direction. The beamformer 304 uses the DOA information to process the audio signals by forming a beam that has a high gain in the direction from the principal direction ($d_1$) from which wanted signals are received at the microphone array 106 and a low gain in the directions to any other signals sources (e.g. $d_2$, $d_3$ and $d_4$).

The beamforming module 303 can also determine the interfering directions of arrival ($d_2$, $d_3$ and $d_4$), and advantageously the beamformer 304 can be adapted such that particularly low gains are applied to audio signals received from those interfering directions of arrival in order to suppress the interfering audio signals. As well as distinguishing between directions of arrival of audio signals at the microphone array 106, the beamforming module 303 may also distinguish between distances of arrival of audio signals at the microphone array 106. The direction and distance from which an audio signal is received determine a location from which the audio signal is received. Audio signals received from different source locations will have different delay patterns across the plurality of microphones ($302_1$, $302_2$ and $302_3$) of the microphone array 106. Whilst it has been described above that the beamforming module 303 can determine any number of principal directions, the number of principal directions determined affects the properties of the beamformer e.g. for a large number of principal directions the beamformer 304 will apply less attenuation of the signals received at the microphone array from the other (unwanted) directions than if only a single principal direction is determined. The output of the beamformer 304 is provided to further processing means of the device 102 in the form of a single channel to be processed. The output of the beamformer 304 may be used in many different ways in the device 102 as will be apparent to a person skilled in the art. For example, the output of the beamformer 304 could be used as part of a communication event in which the user 202 is participating using the device 102.

The output of the beamformer 304 may be subject to further signal processing (such as automatic gain control and noise suppression). The details of such further signal processing is beyond the scope of this invention and so the details of the further signal processing are not given herein, but a skilled person would be aware of ways in which the output of the beamformer 304 may be processed in the device 102.

Figure 4:
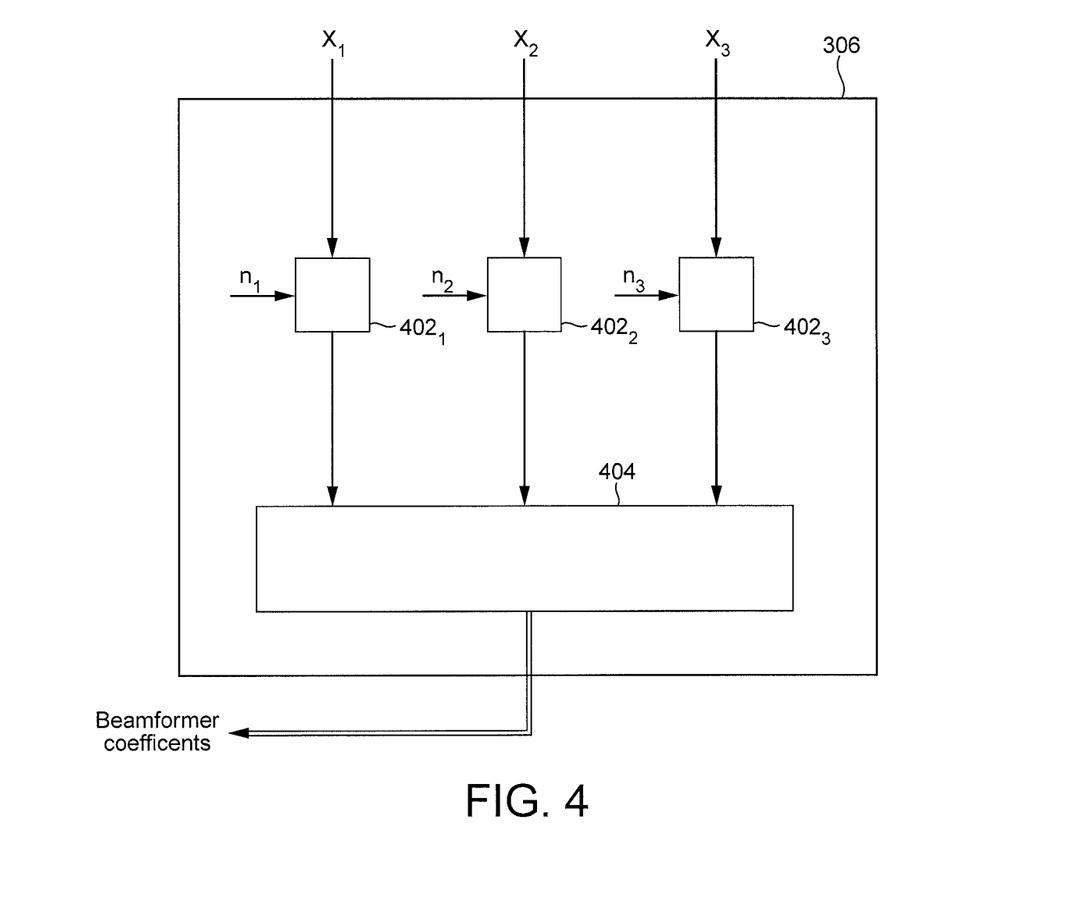
FIG. 4 shows a functional block diagram of a part of the device shown in FIG. 3.

In operation, the processing means 306 is arranged to receive the audio signals $x_1$, $x_2$ and $x_3$ from the microphones $302_1$, $302_2$ and $302_3$ of the microphone array 106 and to adapt the beamformer 304 that is to be applied to the audio signals $x_1$, $x_2$ and $x_3$. The processing means 306 modifies the audio signals to thereby include noise signals in the audio signals before the beamformer is updated based on the modified audio signals. The noise signals (i.e. "regularization signals") are included in the audio signals with delay patterns matching the source location (i.e. direction and distance of arrival) of the interfering audio signals. In this way the noise signals are highly correlated in the direction of the interfering audio signals such that when the beamformer 304 is updated it should apply a high level of attenuation to audio signals from the location (i.e. direction and distance) of the interfering audio signals. As shown in FIG. 4, the processing means 306 comprises three mixing blocks $402_1$, $402_2$ and $402_3$ and a processing block 404. Each of the mixing blocks $402_1$, $402_2$ and $402_3$ are arranged to receive a respective one of the audio signals $x_1$, $x_2$ and $x_3$ from the microphones $302_1$, $302_2$ and $302_3$. Each of the mixing blocks $402_1$, $402_2$ and $402_3$ are also arranged to receive a respective one of a plurality of noise signals $n_1$, $n_2$ and $n_3$. The mixing blocks $402_1$, $402_2$ and $402_3$ sum the respective audio signals $x_1$, $x_2$ and $x_3$ with the respective noise signals $n_1$, $n_2$ and $n_3$. In other embodiments the mixing blocks may perform other operations on the audio signals and noise signals, for example the mixing blocks may multiply the audio signals and the noise signals. In some embodiments the audio signals $x_1$, $x_2$ and $x_3$ and the noise signals $n_1$, $n_2$ and $n_3$ are scaled before they are input to the respective mixing blocks $402_1$, $402_2$ and $402_3$. The weighting applied in the scaling can be varied (e.g. between 0 and 1) to thereby adjust the proportion of the outputs from the mixing blocks $402_1$, $402_2$ and $402_3$ that is from the received audio signals $x_1$, $x_2$ and $x_3$ and the corresponding proportion that is from the noise signals $n_1$, $n_2$ and $n_3$. In some embodiments the weighting applied in the scaling may be such that the output of the mixing blocks $402_1$, $402_2$ and $402_3$ is entirely based on the noise signals $n_1$, $n_2$ and $n_3$ (and therefore not based on the audio signals $x_1$, $x_2$ and $x_3$). In this way the output of the mixing blocks $402_1$, $402_2$ and $402_3$ may be based entirely on artificially generated regularization signals—i.e. noise signals $n_1$, $n_2$ and $n_3$. This can be useful to controlling the variation of the outputs of the mixing blocks $402_1$, $402_2$ and $402_3$ in a controlled manner. Outputs of the mixing blocks $402_1$, $402_2$ and $402_3$ are coupled to inputs of the processing block 404. The processing block 404 is configured to calculate the filter coefficients for the beamformer 304 based on the signals received from the mixing blocks $402_1$, $402_2$ and $402_3$. The output filter coefficients of the processing block 404 are coupled to the beamformer 304 as inputs for providing the properties of the beamformer 304 as found during adaptation in the processing block 404.

Figure 5:
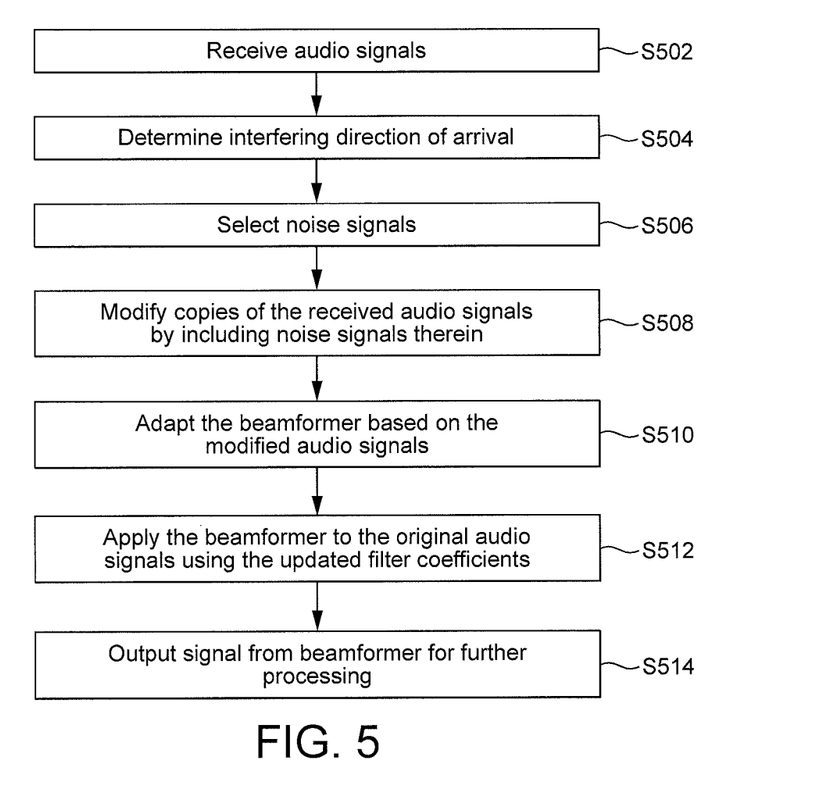
FIG. 5 is a flow chart for a process of processing audio signals according to a preferred embodiment.

With reference to FIG. 5 there is now described a method of processing audio signals according to a preferred embodiment. In step S502 audio signals are received at the microphones ($302_1$, $302_2$ and $302_3$) of the microphone array 106. The audio signals are received, for example, from the user 202, the user 204, the fan 206 and the wall 208 as shown in FIG. 2. Other interfering audio signals, such as background noise, may also be received at the microphones ($302_1$, $302_2$ and $302_3$) of the microphone array 106. The audio signals received by each microphone ($302_1$, $302_2$ and $302_3$) of the microphone array 106 are passed to the beamforming module 303.

When analyzing the multi-microphone input signals with the purpose of enhancing one or more audio signals (e.g. a speech signal from the user 202), it is identified from where in space the audio signals are arriving. As described in more detail below in relation to FIG. 7, the direction of arrival can be determined from the delay between the signal of each microphone, $302_1$, $302_2$ and $302_3$ of the microphone array 106, with the highest correlation. Embodiments of the invention are applicable even if, e.g., the distance between the microphones $302_1$, $302_2$ and $302_3$ in the microphone array 106 is too large for the directions of arrival to be determined unambiguously. Indeed, any (even if it is ambiguous) source location (that is, direction and distance of arrival) can be used to generate the noise signals for injection into the audio signals).

The beamforming module 303 determines the direction of arrival of audio signals received at the microphones $302_1$, $302_2$ and $302_3$ of the microphone array 106. In particular, in step S504 the interfering direction of arrival of an interfering audio signal (e.g. from the user 204) is determined. This is achieved by analysing the audio signals. A person skilled in the art may be aware of multiple methods for determining the interfering direction of arrival of an interfering audio signal. For example, the directions of arrival of audio signals may be determined based on a determination as to the direction in which the audio signals received at the microphones $302_1$, $302_2$ and $302_3$ are most highly correlated (e.g. as described in more detail below in relation to FIG. 7).

Once the interfering directions of arrival have been determined then in step S506 the noise signals $n_1$, $n_2$ and $n_3$ are selected and in step S508 the selected noise signals are included in the respective audio signals $x_1$, $x_2$ and $x_3$ in the respective mixing blocks $402_1$, $402_2$ and $402_3$. The noise signals are selected to have a particular spectral shape. For example, the noise signals may represent white noise. The noise signals can be selected such that they comprise statistically independent samples which will only correlate when they are perfectly aligned. The noise signals are selected such that they have a delay pattern which matches that of audio signals received at the microphone array 106 from the interfering direction of arrival determined in step S504. The delay pattern between the values in the audio signals $x_1$, $x_2$ and $x_3$ corresponds to a particular direction (and optionally a distance also) from which the audio signals are received at the respective microphones $302_1$, $302_2$ and $302_3$ of the microphone array 106. Therefore by including the noise signals $n_1$, $n_2$ and $n_3$ with the particular delay pattern this corresponds to adding noise to the audio signals, as if the noise were received at the microphones $302_1$, $302_2$ and $302_3$ of the microphone array 106 from the interfering direction of arrival. Therefore the modified versions of the audio signals $x_1$, $x_2$ and $x_3$ output from the mixing blocks $402_1$, $402_2$ and $402_3$ include noise signals which are correlated in the interfering direction of arrival. These modified versions of the audio signals can be thought of as being directionally regularized versions of the audio signals received at the microphones $302_1$, $302_2$ and $302_3$ of the microphone array 106. As described above, in some embodiments the outputs from the mixing blocks $402_1$, $402_2$ and $402_3$ may include only the noise signals $n_1$, $n_2$ and $n_3$.

In step S510 the processing block 404 processes the modified audio signals output from the mixing blocks $402_1$, $402_2$ and $402_3$ to update the beamformer 304 filter coefficients. The beamformer may be updated under a number of constraints. For example, when the beamformer is an MVDR beamformer, it is adapted so as to minimise the energy in the beamformer output within the constraint of not distorting the desired audio signals received with the principal direction of arrival at the microphone array 106 (e.g. at 0 degrees). Other types of beamformers may have other beamforming constraints within which the beamformer should be updated.

The noise signals $n_1$, $n_2$ and $n_3$ included in the audio signals $x_1$, $x_2$ and $x_3$ in the mixing blocks $402_1$, $402_2$ and $402_3$ are highly correlated in the interfering direction of arrival determined in step S504, such that when the beamformer 304 has been updated it will process the received audio signals $x_1$, $x_2$ and $x_3$ and produce an output with a high level of attenuation applied to audio signals having the interfering direction of arrival at the microphone array 106. The beamformer filter coefficients describe to the beamformer 304 how to process the audio signals $x_1$, $x_2$ and $x_3$ to generate the beamformer output.

In step S512 the beamformer 304 applies the beamformer filter coefficients determined in step S510 to the audio signals $x_1$, $x_2$ and $x_3$ to thereby generate the beamformer output. In step S514 the beamformer output is output from the beamforming module 303 for further processing in the device 102. The directional regularization of the audio signals $x_1$, $x_2$ and $x_3$ prior to the update of the beamformer filter coefficients improves the quality of the beamformer output by reducing the amplitude of the interfering audio signals received from the interfering direction and by reducing distortion of those interfering audio signals.

Therefore, according to the method described above, the coefficients of the beamformer are adapted based on the directionally regularized input signals (i.e. the modified audio signals output from the mixing blocks $402_1$, $402_2$ and $402_3$). The original microphone input signals (without the directional regularization), that is, signals $x_1$, $x_2$ and $x_3$ are filtered by the beamformer 304 using these coefficients (as determined in step S510) to produce the final beamformer output.

In the preferred embodiments described above, the method injects regularization noise into the audio signals $x_1$, $x_2$ and $x_3$ using statistically independent samples of white noise to ensure that the noise signals only correlate when they are perfectly aligned. In other embodiments, the regularization noise might not be white noise but may instead have a coloured spectrum. Using a coloured spectrum for the regularization noise may be advantageous in some scenarios, and the particular spectrum of the regularization noise may be specifically selected to provide optimum performance of the beamformer 304. For example, an interfering source of interfering audio signals may have an interfering direction of arrival at the microphone array 106 such that the audio signals have a delay between two adjacent microphones (e.g. microphones 302₁ and 302₂) of δ samples of the audio signal. In a preferred embodiment δ is a fractional number, but in some other embodiments δ can be an integer number. That is, there may be a delay δ from which we have or have had high correlation, for example as indicated by means of a high correlation coefficient in the covariance matrix. The audio signals $x_1$, $x_2$ and $x_3$ are regularized in the direction of the interfering source by adding the same realization of statistically independent white noise to $x1(t)$ and to $x2(t+\delta)$. Resampling, particularly upsampling, of the microphone signals may be applied to end up with integer indices when δ is a fractional number.

Figure 6A:
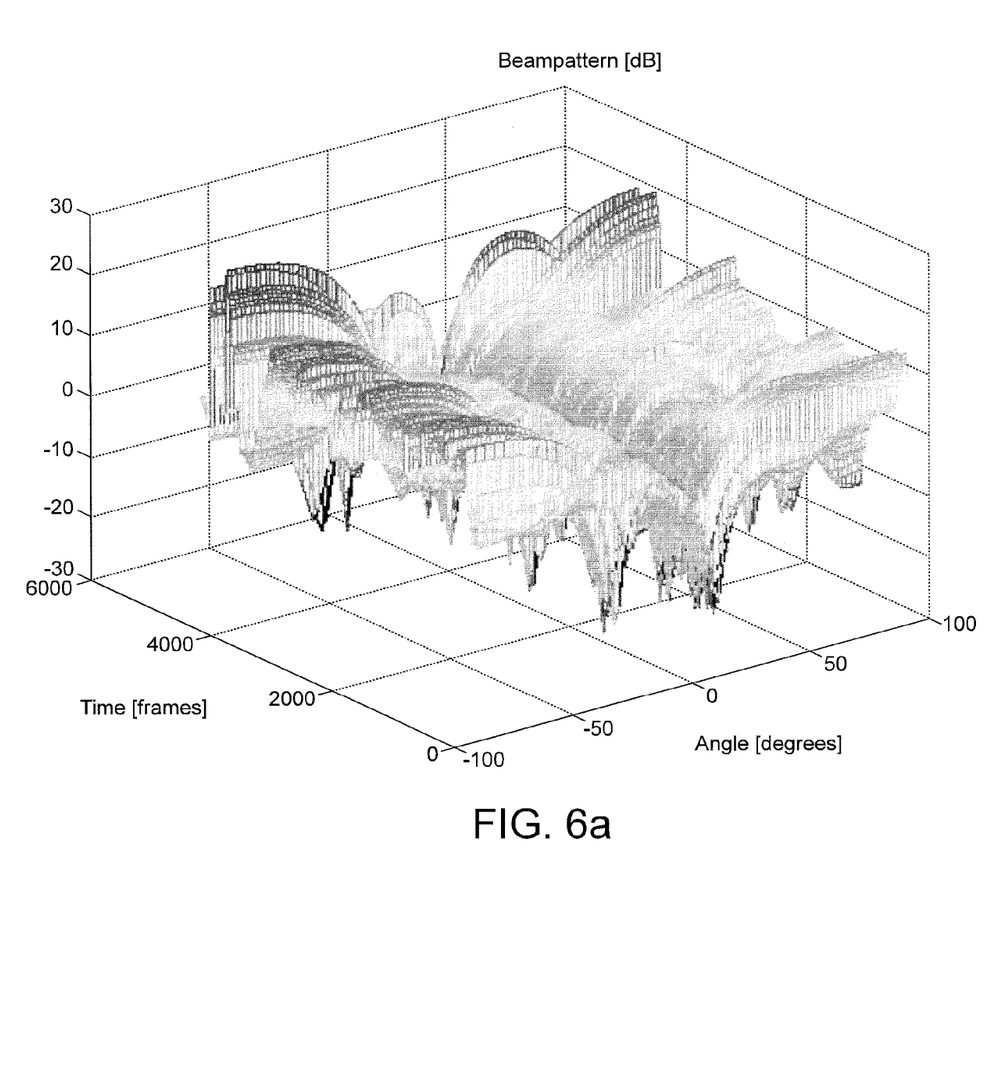
FIG. 6*a* is a plot showing the beampattern of an MVDR beamformer as a function of time and angle when directional regularization has not been applied.
Figure 6B:
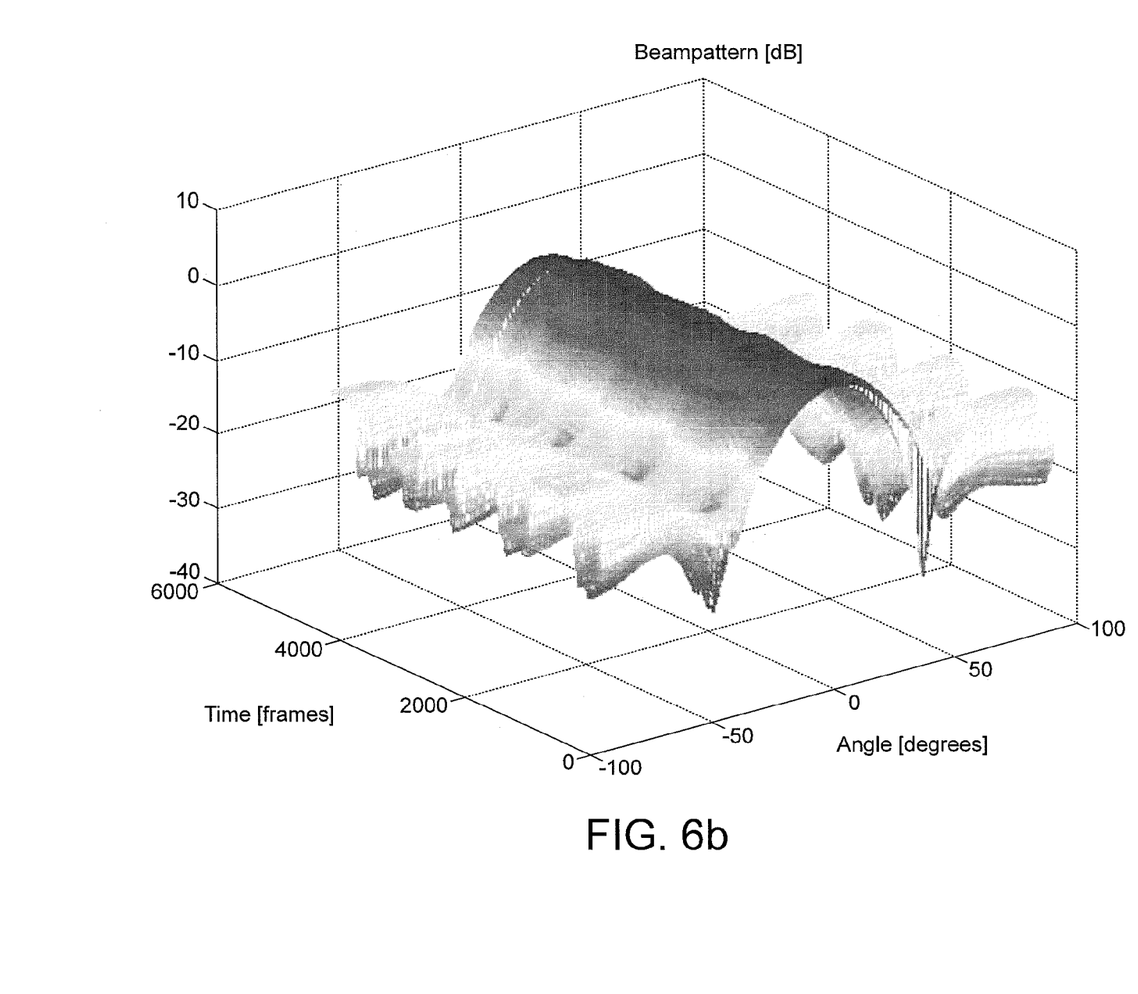
FIG. 6*b* is a plot showing the beampattern of an MVDR beamformer as a function of time and angle when directional regularization has been applied.

FIG. 6a is a plot showing the beampattern of an MVDR beamformer as a function of time and angle when directional regularization has not been applied. FIG. 6b is a plot showing the beampattern of an MVDR beamformer as a function of time and angle when directional regularization has been applied. The same audio signals are received at the microphone array 106 in both cases for FIG. 6a and FIG. 6b. In both cases there are a number of sources of interfering audio signals arriving at the microphone array 106 from a number of different directions. By comparing FIG. 6a with FIG. 6b, the smooth nature of the beampattern when it is directionally regularized, as in FIG. 6b, is apparent.

The beampattern shown in FIG. 6a (when directional regularization has not been applied) is rapidly varying at angles away from the principal direction of arrival (at 0 degrees in this example). Furthermore, the amplitude of the beampattern rises to large values for angles away from the principal direction of arrival. This can be detrimental as audio signals received from angles away from the principal direction of arrival may suffer from distortion as a result of the beamforming process and there may be undesired amplification of audio signals from directions away from the principal direction of arrival. An adaptive beamformer will by nature always lag slightly behind the current conditions, and the extreme fluctuations can lead to audible distortion of the interfering sources in the beamformer output.

This is in contrast to the beampattern shown in FIG. 6b in which the amplitude of the beampattern for angles away from the principal direction of arrival (i.e. away from 0 degrees) is low compared to the amplitude of the beampattern at 0 degrees. Furthermore, the fluctuations in the beampattern at angles away from the principal direction of arrival evolve slowly, thereby reducing distortion in the audio signals received at the angles away from the principal direction of arrival. The beampattern shown in FIG. 6b therefore provides for a higher quality beamformer output than that provided for by the beampattern shown in FIG. 6a. This is a result of the directional regularization applied to the audio signals, as described above—that is, by including the noise signals as described above to modify the audio signals and then calculating the beampattern based on the modified audio signals. Furthermore, as an important aspect of preventing undesired rapid fluctuations, the injected noise may be scaled to a level where it takes a dominating role when compared to the microphone input signals.

In the embodiments where the outputs from the mixing blocks 402₁, 402₂ and 402₃ are based solely on the regularization noise signals $n_1$, $n_2$ and $n_3$ the behaviour of the beamformer 304 can be accurately controlled by appropriate selection of the regularization noise signals $n_1$, $n_2$ and $n_3$ to vary in a smooth manner.

The operation of direction of arrival (DOA) estimation performed by the beamformer 304 and/or the processing means 306 to determine an interfering direction of arrival of an interfering audio signal from the user 204 will now be described in more detail with reference to FIG. 7.

The DOA information is estimated by the beamformer 304 by means of estimating the time delay, e.g. using correlation methods, between received audio signals at the plurality of microphones of the microphone array 106, and estimating the source of the audio signal using the a priori knowledge about the location of the plurality of microphones 302₁, 302₂ and 302₃ of the microphone array 106.

Figure 7:
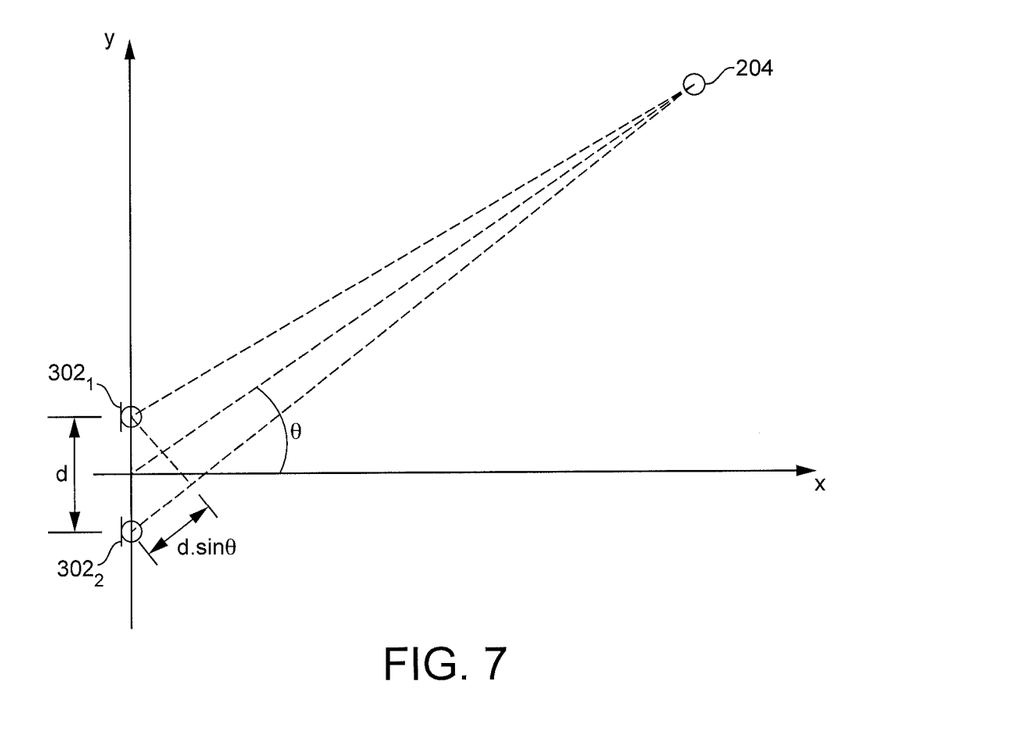
FIG. 7 shows a diagram representing how Direction of Arrival information is estimated in one embodiment.

As an example, FIG. 7 shows microphones 302₁ and 302₂ of the microphone array 106 receiving audio signals on two separate input channels from the interfering audio source 204. For ease of understanding FIG. 7 shows a point source 204 where waves are propagating in a circular motion away from the source 204. This is how it is in real-life, but the equation shown below assumes that the received audio signals are received at the microphones 302₁ and 302₂ as plane waves. This assumption is a good assumption when the point source 204 is 'far enough' away from the microphones 302₁ and 302₂. However, it should be noted that the plane wave assumption is merely used to simplify the math, and is not in any way a pre-requisite for the current invention, which works equally well without the plane wave assumption. The actual angle θ is not needed for the generation of the regularization noise because the time delay between the receipt of signals at the microphones (302₁ and 302₂) is sufficient for generating the regularization signals having the correct delay pattern. The direction of arrival of the audio signals at microphones 302₁ and 302₂ separated by a distance, d, can be estimated using equation (1):

$$\theta = \arcsin\left(\frac{\tau_D v}{d}\right) \quad (1)$$

where $v$ is the speed of sound, and $\tau_D$ is the difference between the times that the audio signals from the interfering source 204 arrive at the microphones 302₁ and 302₂—that is, the time delay. The distance, d, is a known parameter for the microphone array 106 and the speed of sound, $v$, is known (approximately 340 ms⁻¹). The time delay, $\tau_D$, is obtained as the time lag that maximises the cross-correlation between the received interfering audio signals at the outputs of the microphones 302₁ and 302₂. The angle, θ, may then be found which corresponds to this time delay using equation (1) given above. Speech characteristics can be detected in audio signals received with the delay of maximum cross-correlation to determine one or more interfering direction(s) of an interfering speaker.

It will be appreciated that calculating a cross-correlation of signals is a common technique in the art of signal processing and will not be describe in more detail herein.

The steps S504 to S510 may be performed continuously, periodically or non-periodically in different embodiments of the invention.

In the example embodiments described above the microphone array 106 is a 1-D array of microphones (302₁, 302₂ and 302₃) which allows the beamformer 304 to distinguish between audio signals received with different angles in one dimension (e.g. along a horizontal axis). In alternative embodiments, the microphone array 106 may be a 2-D or a 3-D array of microphones which would allow the beamformer 304 to distinguish between audio signals received with different angles in two or three dimensions respectively (e.g. along horizontal, vertical and depth axes).

As described above, the beamforming module 303 comprising the beamformer 304 and the processing means 306 may be implemented in software executed on the CPU 104 or implemented in hardware in the device 102. When the beamforming module 303 is implemented in software, it may be provided by way of a computer program product embodied on a non-transient computer-readable medium which is configured so as when executed on the CPU 104 of the device 102 to perform the function of the beamforming module 303 as described above.

Whilst the embodiments described above have referred to a microphone array 106 receiving one desired audio signal ($d_1$) from a single user 202, it will be understood that the microphone array 106 may receive audio signals from a plurality of users, for example in a conference call which may all be treated as desired audio signals. In this scenario multiple sources of wanted audio signals arrive at the microphone array 106.

The inclusion of quadratic constraints in order to avoid energy amplification is a crude tool for ensuring no energy amplification in a way that is not selective for specific angles, and thereby reduces the degrees of freedom available for the beamformer 304 to suppress interferences. The combination of the quadratic constraints approach with the directional regularization of embodiments of the invention allows for less strict quadratic constraints to be used, thereby increasing the ability for the beamformer 304 to suppress interferences.

The device 102 may be a television or a computer or any other suitable device for implementing the invention.

For simplicity, in the description of the embodiments above, only one interfering direction of arrival is determined such that the noise signals are included with a delay pattern matching that particular direction of arrival. However, since the noise signals can add linearly, embodiments of the invention can be used where there are multiple interfering directions of arrival of interfering audio signals from multiple interference sources. The noise signals can be selected such that they are a combination (e.g. a sum) of noise signals having delay patterns matching those of audio signals from each of the interfering directions of arrival. By including these noise signals in the audio signals, the beamformer coefficients may be calculated based on the modified versions of the audio signals having noise included in multiple directions of arrival (matching the interfering directions of arrival). In this way, when the beamformer 304 applies the beamformer coefficients to the audio signals a high level of attenuation will be applied to each of the interfering audio signals from each of the interfering directions of arrival.

Furthermore, while this invention has been particularly shown and described with reference to preferred embodiments, it will be understood to those skilled in the art that various changes in form and detail may be made without departing from the scope of the invention as defined by the appendant claims.

What is claimed is:

1. A method of processing signals at a device, the method comprising:
   receiving signals, over a range of angles, at a plurality of sensors of the device, the received signals including an interfering signal received from an interfering source location;
   determining an interference delay pattern between receipt of signals at the sensors corresponding to receipt of a signal from the interfering source location;
   generating a plurality of regularization signals having a delay pattern matching the determined interference delay pattern;
   using the generated regularization signals to determine beamformer coefficients to be applied by a beamformer; and
   the beamformer applying the determined beamformer coefficients to the signals received by the plurality of sensors, thereby generating a beamformer output.

2. The method of claim 1 wherein the beamformer coefficients are determined based solely on the generated regularization signals.

3. The method of claim 1 wherein the beamformer coefficients are determined based on a combination of the generated regularization signals and the received signals.

4. The method of claim 3 further comprising determining modified versions of the received signals in which the plurality of regularization signals are included in the respective signals received by the plurality of sensors, and wherein the beamformer coefficients are determined based on the modified versions of the received signals.

5. The method of claim 1 wherein the signals received by the plurality of sensors further include a primary signal received from a principal source location.

6. The method of claim 1 wherein said beamformer coefficients are determined so as to minimise the power in the signals which are used t'o determine said beamformer coefficients, and within beamforming constraints of the beamformer.

7. The method of claim 5 wherein beamforming constraints of the beamformer comprise a constraint that the primary signal is not perceptably distorted by the application of the beamformer coefficients.

8. The method of claim 1 wherein the regularization signals are mutually uncorrelated noise signals.

9. The method of claim 8 wherein the noise signals have a predetermined spectral shape.

10. The method of claim 9 wherein the noise signals represent white noise.

11. The method of claim 8 wherein the noise signals comprise statistically independent samples.

12. The method of claim 1 further comprising selecting the plurality of regularization signals such that the beamformer coefficients vary sufficiently slowly to prevent variations of the beamformer coefficients causing distortion of the beamformer output.

13. The method of claim 1 further comprising using the beamformer output to represent the signals received at the plurality of sensors for further processing within the device.

14. The method of claim 1 wherein the signals are one of: (i) audio signals, (ii) general broadband signals, (iii) general narrowband signals, (iv) radar signals, (v) sonar signals, (vi) antenna signals, (vii) radio waves and (viii) microwaves.

15. A device for processing signals, the device comprising:
   a beamformer;
   a plurality of sensors for receiving signals over a range of angles, the received signals including an interfering signal received from an interfering source location;
   means for determining an interference delay pattern between receipt of signals at the sensors corresponding to receipt of a signal from the interfering source location;
   means for generating a plurality of regularization signals having a delay pattern matching the determined interference delay pattern; and means for using the generated regularization signals to determine beamformer coefficients to be applied by the beamformer, wherein the beamformer is configured to apply the determined beamformer coefficients to the signals received by the plurality of sensors, to thereby generate a beamformer output.

16. The device of claim 15 wherein the signals are audio signals and the sensors are microphones for receiving the audio signals.

17. The device of claim 15 wherein the beamformer is a Minimum Variance Distortionless Response beamformer.

18. A computer program product for processing signals received over a range of angles, at a plurality of sensors of a device, the received signals including an interfering signal received from an interfering source location, the computer program product being embodied on a computer-readable storage device and configured so as when executed on a processor of the device to perform operations comprising:

determining an interference delay pattern between receipt of signals at the sensors corresponding to receipt of a signal from the interfering source location;

generating a plurality of regularization signals having a delay pattern matching the determined interference delay pattern;

using the generated regularization signals to determine beamformer coefficients to be applied by a beamformer; and implementing the beamformer to apply the determined beamformer coefficients to the signals received by the plurality of sensors, thereby generating a beamformer output.

19. A device configured to process signals, the device comprising:

a beamformer;

a plurality of sensors configured to receive signals over a range of angles, the received signals including an interfering signal received from an interfering source location;

a determining block configured to determine an interference delay pattern between receipt of signals at the sensors corresponding to receipt of a signal from the interfering source location;

a generating block configured to generate a plurality of regularization signals having a delay pattern matching the determined interference delay pattern; and a block configured to use the generated regularization signals to determine beamformer coefficients to be applied by the beamformer, wherein the beamformer is configured to apply the determined beamformer coefficients to the signals received by the plurality of sensors, to thereby generate a beamformer output.

* * * * *